May 6, 1952  F. H. CAREY  2,595,566
UNIVERSAL PIPE CONNECTION FOR SPILL BURNERS
Filed Oct. 31, 1949
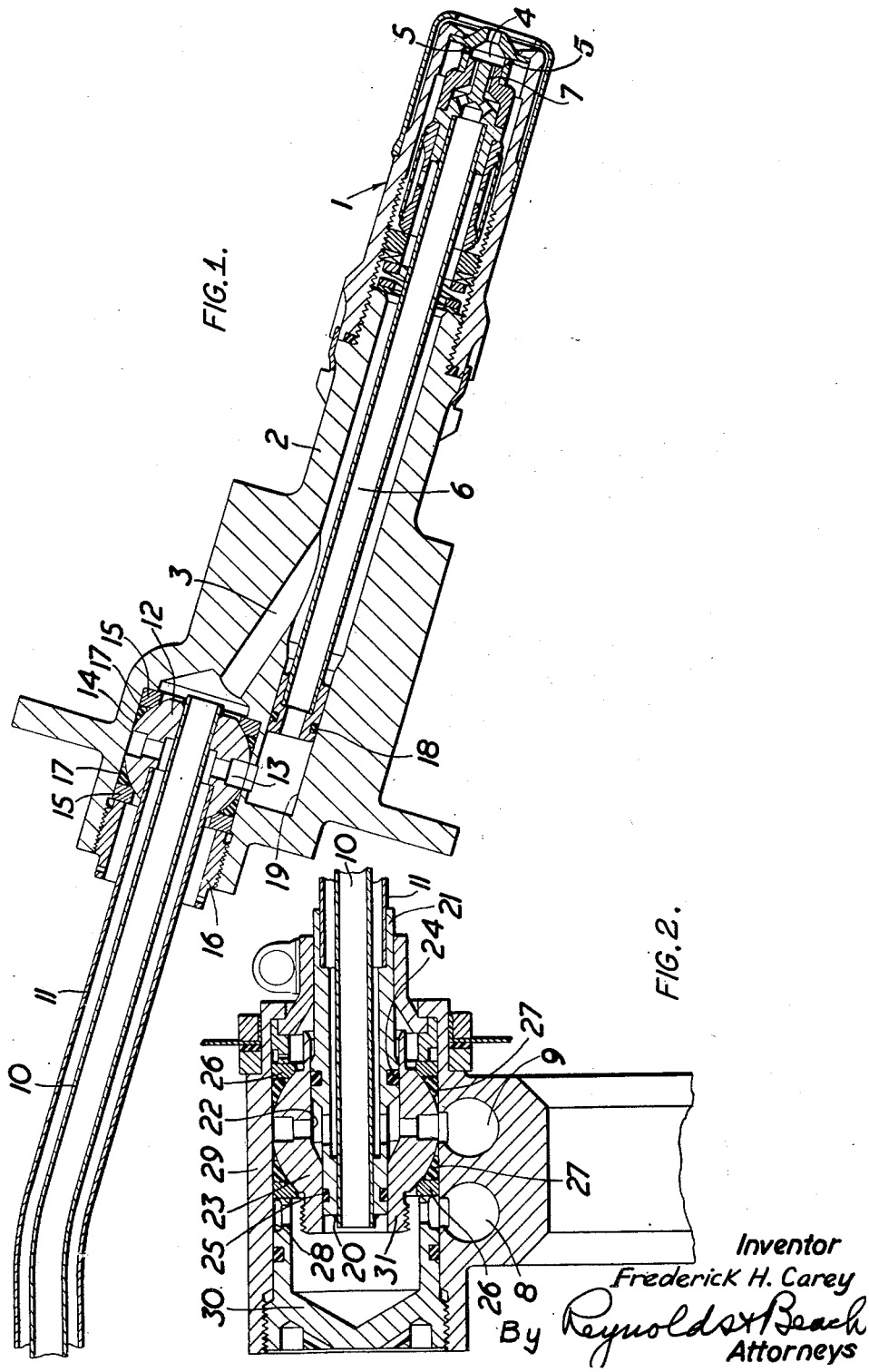
Inventor
Frederick H. Carey
By Reynolds & Beach
Attorneys Patented May 6, 1952

2,595,566

UNITED STATES PATENT OFFICE 2,595,566

UNIVERSAL PIPE CONNECTION FOR SPILL BURNERS

Frederick Henry Carey, Cheltenham, England, assignor to Dowty Equipment Limited, Cheltenham, England.

Application October 31, 1949, Serial No. 124,633
In Great Britain August 23, 1948

2 Claims. (Cl. 60—39.31)

The present invention consists in a universal coupling between two pipes and a housing having two ports, one for each pipe, in which the pipes extend into a universal member through which separate flow communication is established between the pipes and ports, and in which the universal member is rotationally located in the housing by socket members and has the flow communication of one pipe sealed from that of the other. If the two pipes are to establish flow communication between two separated pairs of ports the distance between which pairs of ports may vary, e. g. due to vibration or as a result of uneven temperature conditions or because of manufacturing tolerances, the two pipes will be provided at both ends with a universal coupling in accordance with the invention. In such an arrangement it is preferred in accordance with a further feature of the invention to arrange for the universal member at one end to slide relatively to the pipes. Thus standardised substantially rigid pipe fittings may be used for different separated pairs of ports having different distances between them, and the fittings will accommodate themselves in use to any variations in the distance between a pair of separated ports. In all cases the fitting comprising the two pipes and the two universal couplings at the ends of the pipes respectively will accommodate itself to these variations by slight rotation of the universal members with respect to their housings and by slight elongation or contraction of the fitting as a whole permitted by axial movement of the pipes relative to the universal member at one end.

If radial space for the fitting be limited, it is desirable to arrange one pipe inside the other, the inner pipe extending completely through the universal members and the outer pipe extending into the universal members and communicating with the corresponding ports at each end through side ports formed in the members.

Each universal member may be located and resiliently mounted within its housing by rubber or like rings encircling the member and serving to seal the flow communication of one pipe from that of the other. The invention has been devised more especially for use in conjunction with continuous combustion turbine engines employing burners requiring two conduits. The invention can therefore be used with advantage in connection with spill burners in which one conduit serves to connect the burner-ring with the inlet passage leading to the swirl chamber of the burner and the other conduit serves to connect the return or spill passage with the collector-ring. The invention is also of use with burners known as duplex burners having two supply conduits leading to different swirl ports. The burners are mounted on part of the engine whereas the pipes are to extend from the burners to supply manifolds which may be mounted on the aircraft structure. It will be appreciated that vibration of the engine will bring about relative movements between the ports interconnected by the pipes, and that having regard to the size of the parts, the corresponding pairs of ports may not all be exactly similarly located. The invention is also of importance when used on an internal combustion turbine engine owing to the wide range of temperature changes to which the mounting for the port housings, though not the pipes, is subjected. The wide variations in temperature bring about an appreciable variation in the distance between the port housings and this is accommodated by the ability of the pipe fitting to elongate or contract as required. By arranging the pipes as a unitary structure with the universal member at each end, standardized units of a substantially rigid nature may be used for all the burners without imposing, either during fitting or during use, any undue strains or stresses upon the units.

In order that the nature of the invention may be more clearly understood an embodiment devised for establishing flow communication between spill burners and burner and collector rings of a continuous combustion turbine engine will now be described by way of example with reference to the sectional drawings which accompany the specification.

Figure 1 is a longitudinal section of a spill type burner and housing therefor incorporating a pipe fitting constructed in accordance with the invention, for interconnection with burner and collector ring duct structure.

Figure 2 is a corresponding view of structure defining burner and collector ring ducts and incorporating a pipe fitting constructed in accordance with the invention, for interconnection with a burner housing.

In the drawings, a burner of the spill type, indicated generally at 1, is screwed into a housing 2 incorporating a supply passage 3 along which fuel is fed to enter into the swirl chamber 4 through swirl ports 5, and a return passage 6 leading from the spill orifice 7. All the burners are arranged as a circular series and each burner housing 2 is secured to an annular mounting plate, not shown. Fuel is supplied to all the supply lines 3 from a burner-ring 8, and all the return passages 6 lead to a collector-ring 9. For each burner there are provided two pipes respectively connecting collector rings 8 and 9 with the supply and return passages 3 and 6 of the burner. In the example illustrated, two pipes 10 and 11 for the burner 1 are arranged co-axially. At the burner ends of the pipes, the pipes 10 and 11 are rigidly secured to a universal member 12 of spherical form. The pipe 10 extends completely through the member 12 to communicate with the passage 3 and the pipe 11 opens to a side port 13 in the member 12 and communicates with the passage 6. The member 12 is located in a cylindrical recess 14 in the housing 2 between socket members 15 which are lightly clamped against the member 12 by a threaded retainer sleeve 16. The side port 13 is sealed from the end of the pipe 10 by sealing washers 17 encircling the member 12 at either side of the port 13. When so fitted the universal member 12 together with the pipes 10 and 11 rigidly secured thereto can rotate slightly to the extent of the limits imposed by the socket member 15 remote from the burner 1. It will be noted that the pipe 6 is removable with the burner 1 from the housing 2 and that this pipe is glanded at 18 in a bore 19 in the housing 2.

The connections between the pipes 10 and 11 with the burner and collector rings 8 and 9 respectively are established in a similar manner to that already described in connection with the passages 3 and 6. However, in order to allow the fitting as a whole to be elongated or contracted, the pipe 11 is rigidly connected at 20 to the end of a sleeve 21 which is slidable as a piston within a bore 22 in a universal member 23, the sleeve 21 being glanded at 24 and 25. The sleeve 21 is rigidly connected at its opposite end to the pipe 11. Socket members 26 and sealing rings 27 are held in position in a cylindrical bore 28 in a housing 29 defining the burner and collector rings 8 and 9 by an end cap 30 screwed into the housing 29. The universal member 23 has a projection 31 which is threaded externally so that after the cap 30 is removed the member 23 can readily be removed by inserting a suitably threaded tool. If desired, the sleeve 21 may extend beyond the universal member 23 and be externally threaded to receive a nut the purpose of which would be to limit the extent to which the pipes could move out of the universal member. This may be particularly desirable if the two pipes have an acute set in them due to the dispositions of the two housings.

It will be seen that the pipe fitting constituted by the pipes 10 and 11 and by the universal members 12 and 23 is capable of accommodating itself as to its length and as to its angular disposition with regard to its housings 2 and 29 so that standardized fittings may be used for all the burners of the engine even though the distances between the burner mountings and the corresponding sockets of the burner and collector rings may vary and that when fitted vibrations imparted to the burner mountings will not impose any undue strains upon the fittings.

I claim:

1. The piping arrangement for establishing flow communication between an outlet of a burner fuel supply duct and an inlet of a gas turbine engine burner housing, and between an inlet of a fuel return collector duct and a burner fuel return outlet in such burner housing, wherein the burner supply and return collector ducts are defined by rigid common structure relative to which the burner housing is subject to vibrational movement in different directions, said piping arrangement comprising a generally cylindrical socket recess formed in said burner housing and having axially spaced wall openings therein communicating with the burner housing inlet and outlet respectively, a similar socket recess formed in said rigid common structure and having wall openings therein communicating with the burner supply and collector ducts respectively, two coaxially arranged pipes extending generally between the burner housing and the rigid common structure socket recess interiors, to define separate flow passages therebetween, universal bearing elements of generally spherical form rotatively received in the respective socket recesses and in turn supportingly receiving the coaxial pipe ends for conjoint tilting of such pipes with such bearing elements in the respective socket recesses, said coaxial pipes at one end being fixedly connected to the corresponding bearing element and at their opposite end being slidable longitudinally in the corresponding supporting bearing element, each of said bearing elements having a generally axial end opening therein affording flow communication between the inner of said coaxial pipes and the respective socket recess interiors, each of said bearing elements further having a generally lateral side opening therein affording flow communication between the outer of said coaxial pipes and the respective socket recess interiors, thrust bearing means in the respective socket recesses maintaining the respective bearing elements in position axially of such recesses wherein the respective end and side openings of such bearing elements may communicate separately with the axially spaced internal recess wall openings, respectively, and annular seal means surrounding each bearing element and forming a seal thereof with the corresponding socket recess interior at a location therein between the latter's two wall openings.

2. The piping arrangement for establishing flow communication between an outlet of a burner fuel supply duct and an inlet of a gas turbine engine burner housing, and between an inlet of a fuel return collector duct and a burner fuel return outlet in such burner housing, wherein the burner supply and return collector ducts are defined by rigid common structure relative to which the burner housing is subject to movement in different directions, said piping arrangement comprising a generally cylindrical socket recess formed in said burner housing and having axially spaced wall openings therein communicating with the burner housing inlet and outlet respectively, a socket recess formed in said rigid common structure and having wall openings therein communicating with the burner supply and collector ducts respectively, two coaxially arranged pipes extending generally between the burner housing and the rigid common structure socket recess interiors, to define separate flow passages therebetween, universal bearing elements of generally spherical form rotatively received in the respective socket recesses and in turn supportingly receiving the coaxial pipe ends for conjoint tilting of such pipes with such bearing elements in the respective socket recesses, each of said bearing elements having a generally axial end opening therein affording flow communication between the inner of said coaxial pipes and the respective socket recess interiors, each of said bearing elements further having a generally lateral side opening therein affording flow communication between the outer of said coaxial pipes and the respective socket recess interiors, said pipes at one end being fixedly connected to the corresponding bearing element and the latter being fixedly held against axial movement in its socket recess, and said pipes at the opposite end thereof being guided for axial movement in the corresponding socket recess to permit relative approach and separating movement of said burner housing and rigid common structure, and annular seal means surrounding each bearing element and forming a seal thereof with the corresponding socket recess interior at a location therein between the latter's two wall openings.

FREDERICK HENRY CAREY.

REFERENCES CITED

The following references are of record in the file of this patent:

UNITED STATES PATENTS

| Number | Name | Date |
|---|---|---|
| 290,196 | Abel | Dec. 18, 1883 |
| 908,414 | Mellin | Dec. 29, 1908 |
| 1,034,965 | Bradley | Aug. 6, 1912 |
| 1,771,250 | Feild | July 22, 1930 |
| 2,177,781 | Haynes et al. | Oct. 31, 1939 |
| 2,323,635 | Voorheis | July 6, 1943 |
| 2,366,541 | Malkin | Jan. 2, 1945 |
| 2,385,421 | Monroe | Sept. 25, 1945 |

FOREIGN PATENTS

| Number | Country | Date |
|---|---|---|
| 30,501 | Great Britain | Dec. 30, 1909 |
| 918,129 | France | Oct. 7, 1946 |